June 18, 1963 H. A. CORRIGAN 3,094,589

AUDIBLE-VISUAL CUMMUNICATION SYSTEMS

Filed June 15, 1960 2 Sheets-Sheet 1

INVENTOR
HAROLD A. CORRIGAN

BY Meyer Baldwin Doran & Egan
ATTORNEYS

June 18, 1963 H. A. CORRIGAN 3,094,589
AUDIBLE-VISUAL CUMMUNICATION SYSTEMS
Filed June 15, 1960 2 Sheets-Sheet 2

INVENTOR
HAROLD A. CORRIGAN

BY Meyer Baldwin Doran & Egan
ATTORNEYS

United States Patent Office 3,094,589

Patented June 18, 1963

3,094,589

AUDIBLE-VISUAL COMMUNICATION SYSTEMS

Harold A. Corrigan, Euclid, Ohio, assignor to The Standard Products Company, Cleveland, Ohio, a corporation of Ohio Filed June 15, 1960, Ser. No. 36,363
11 Claims. (Cl. 179—40)

Figure 1:
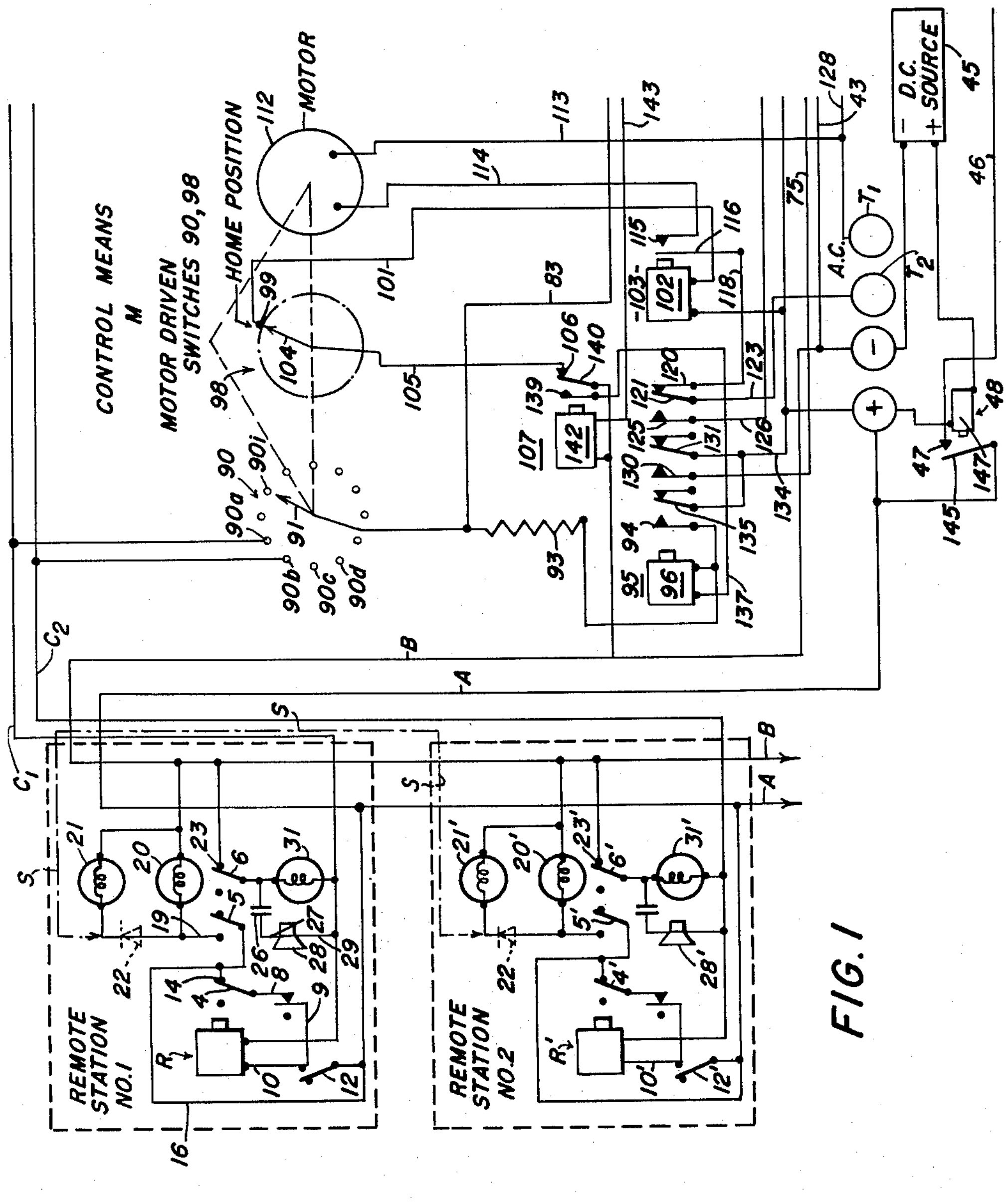

This invention relates to a novel and improved audible-visual intercommunication system and more particularly to a communication system especially designed for use in hospitals and like installations.

The communication system of the present invention has particular utility in installations of the type wherein a plurality of remote stations corresponding for example to the patients' rooms in a hospital installation are interconnected to a central station likewise corresponding to a nurse's duty station in said installation, and further wherein said stations are interconnected so as to provide audible and/or visual communication therebetween, and it is necessary that upon a remote and/or central station placing a call, said calling station must first be manually connected to the station being called such as for example through a switchboard or other suitable interconnecting apparatus before the call or its purpose can be determined.

The inventive concepts of the communication system of the present invention are an improvement over said manually operated system in that control means are interconnected to said stations which are automatically operable to seek out and connect the communicating apparatus at the calling station to the communicating apparatus at the called station.

It is therefore a primary object of the present invention to provide a new and improved audio-visual intercommunication system in which a plurality of remote stations are connected to a central station, said system thus providing audible-visual communication therebetween, and wherein control means interconnected between said stations are automatically operable to seek out and connect the communication apparatus at a calling station to the communicating apparatus at a called station.

Another object of the present invention is the provision of a new and improved audible-visual communication system in which a plurality of remote stations are connected to a central station, said system thus providing two-way audible and/or visual communication therebetween, and wherein control means are automatically operable to seek out and sequentially connect the communicating apparatus at the central station to the communicating apparatus at several or more successively calling remote stations.

Still another object of the present invention is to provide a novel and improved audio-visual intercommunication system in which a plurality of remote stations are connected to a central station, said system thus providing two-way audible-visual communication therebetween, and wherein control means, in response to a remote station placing a call to the central station are automatically responsive to the energization of the communicating apparatus at the central station to connect the latter to the communicating apparatus of said calling station.

Another object of the present invention is the provision of a new and improved audible-visual intercommunication system especially designed for hospitals and like installations, and wherein said system includes a plurality of remote stations interconnected to a central station by means including a pair of conductors common to all of said stations and a third conductor individual to each of said remote stations and which is separately connected to control means, the latter being operable to sequentially connect the communicating apparatus at each of the remote calling stations through its corresponding third conductor to the communicating apparatus at said central called station.

Figure 1A:
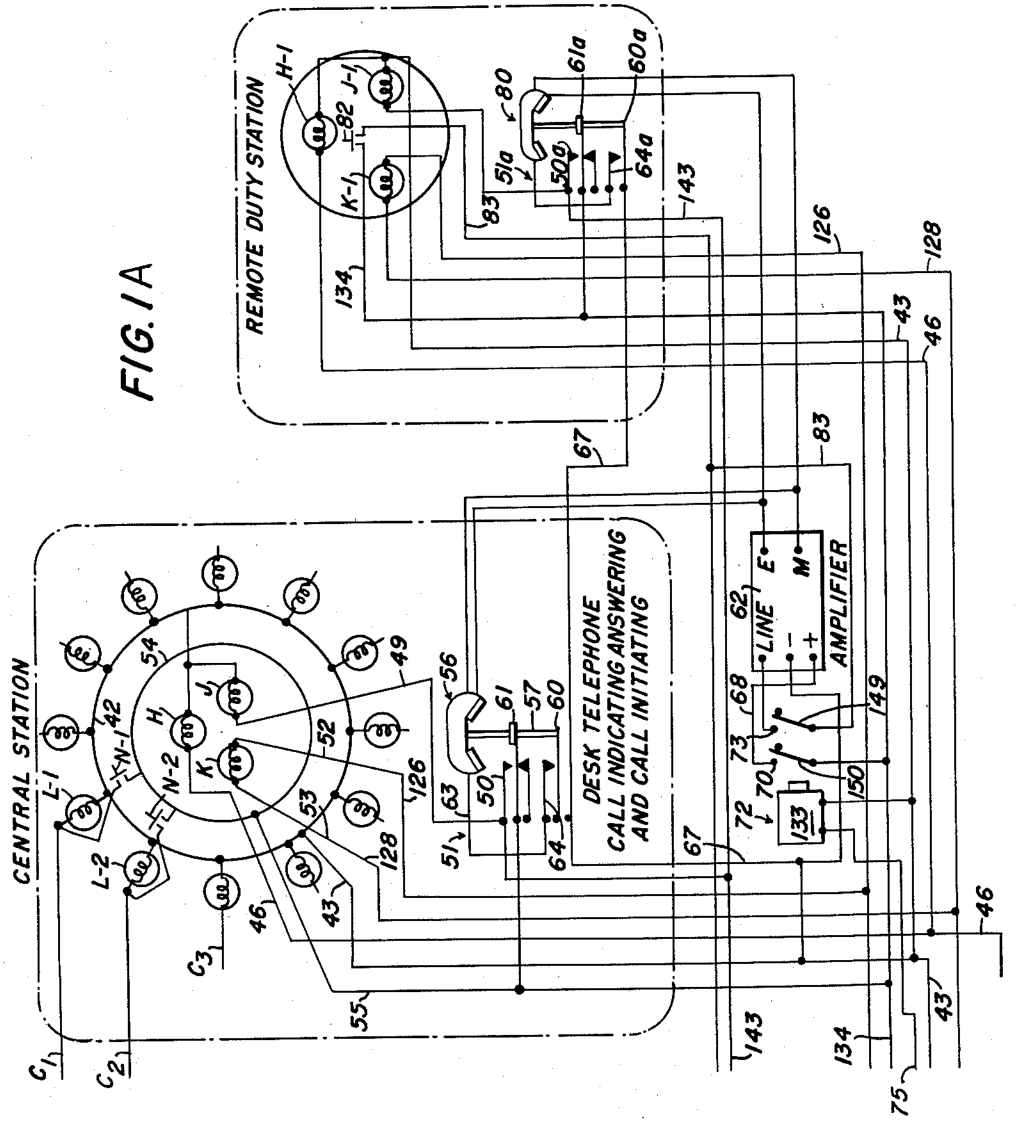
Figure 2:
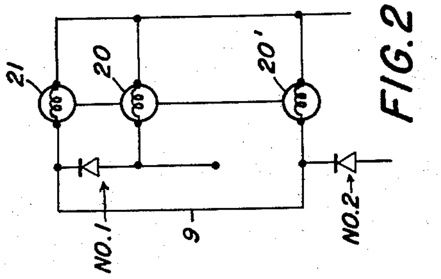

Other objects and advantages of the audible-visual communication system of the present invention will be apparent to one skilled in the art to which it pertains and upon reference to the following detailed description of a preferred embodiment and which is illustrated in the accompanying drawings wherein:

FIGS. 1 and 1A are schematic wiring diagrams of audible-visual intercommunication system embodying the present invention; and, FIG. 2 is a fragmentary wiring diagram of a modified form of intercommunication system of the present invention.

With reference now directed to the aforesaid schematic wiring diagrams of FIGS. 1 and 1A, the embodiment of audible-visual communicating system is herein shown to be especially designed for use with the type of system as is disclosed and claimed in my U.S. Patent 2,892,033 of June 23, 1959.

Said system is seen to include a plurality of remote stations and a central station, each of which has its own two-way communicating apparatus. Said central and remote stations are interconnected by a pair of conductors A and B, said conductors being common to all of said stations, and a third conductor C individual to each remote station and which, in turn, is separately connected to control means M. The third conductor at remote station #1 is identified by the reference character $C_1$, whereas the corresponding third conductor at each of the remaining remote stations (only two of which are herein shown) being identified by the reference character C with the proper identifying suffix being added thereto, for example at remote station #2 the third conductor $C_2$ is associated therewith.

The indicia "remote station #1" in said schematic drawing represents the communicating apparatus associated with one patient's room of a hospital or like installation. As herein seen said apparatus includes a relay R having movable contacts 4, 5 and 6, contact 4 being connected through a normally-closed switch 8 and line 9 to wire 10, the latter connecting to one side of the coil of said relay. The opposite end of said coil is connected to one end of the aforementioned third conductor C individual to said station.

A normally open switch 12 is connected between wire 10 and the aforesaid wire A, which is one of the pair of wires A and B common to all stations of said system. Switch 12 is intended to be momentarily operated by the patient at the remote station when he requests assistance or desires to communicate with the central station. Both switches 8 and 12 may be of the push-button, self-return type so that after being actuated momentarily they may resume their normal de-energized position as will be explained hereinafter in greater detail.

The relay R is seen to have a stationary contact 14 adapted to be engaged by the aforementioned movable relay contact 4, and which, in turn, is connected through wire 16 to the switch 12.

The movable contact 5 of relay R is also seen to be connected directly to said wire 16.

Relay R is likewise provided with a stationary contact 19 which is adapted to be engaged by the aforementioned movable contact 5, is likewise seen to be connected to a pair of indicator lamps 20 and 21 the latter being preferably connected in parallel with each other and across said contact 19 and the aforesaid common conductor B. These indicator lamps are preferably disposed at strategic positions in and/or adjacent the patient's room at each of the remote stations, for example over the patient's bed or just outside of his room so as to be visible in the corridor by the attending personnel.

Relay R is likewise provided with a stationary contact 23 which is adapted to be engaged by the aforesaid movable contact 6, said stationary contact, in addition, being connected to the common conductor B.

Movable contact 6 of said relay R is connected through condenser 26 and wire 27 to one side of a conventional combined speaker-microphone unit 28. To complete the circuit for said latter unit, the same is connected through wire 29 to the aforementioned third conductor $C_1$, to thus be connected to said opposite side of the relay coil.

An indicator lamp 31 is seen to be connected across conductor $C_1$ and relay contact 6 to thus complete the communicating apparatus at said remote station #1. Said indicator lamp, as will be explained hereinafter in greater detail, is illuminated whenever the central station is connected to the remote station for purposes of monitoring the same.

Remote station #2, as indicated in the aforesaid schematic diagram, may be located in the next patient's room in said hospital installation, and is provided with substantially identical communicating apparatus as is herein above identified at remote station #1 and hence will not be additionally described. The individual components of said apparatus at remote station #2 are indicated by the same corresponding reference numerals, the latter being primed to identify their location at said station for example, the combined speaker-microphone unit at remote station #2 is herein identified by the reference numeral 28', the aforesaid relay by the reference character R', etc.

As will be understood, the instant communication system may be and is more likely to have more than two remote stations associated with a single central station, the embodiment of system disclosed herein merely showing two of said remote stations in order to simplify the explanation of the same.

At the central station the visual communicating apparatus includes an indicator lamp L assigned to each of the remote station's location, the lamp for remote station #1 being identified by the reference character L–1, the corresponding lamp for remote station #2 being similarly identified at L–2.

Each indicator lamp L is connected to the third conductor C associated with the respective remote station, L–1 being connected to conductor $C_1$ for remote station #1, indicator lamp L–2 for remote station #2 being connected to third conductor $C_2$.

Each indicator lamp L is likewise seen to be connected to a conductor 42 common to all of said lamps and which is connected by wire 43 to the negative side of a suitable D.C. energy source, as is identified at 45. Each indicator lamp for example L–1 lights whenever a call is placed by remote station #1 to thus identify its origin.

The visual communicating apparatus at the central station also includes an indicator lamp as identified at H which is connected in series with the aforesaid common lamp conductor 42 and a wire 46, said wire being connected to a fixed contact 47 of a relay 48. The indicator lamp H is illuminated whenever a call has been placed from any of the stations to thus indicate that a call has been placed.

An indicator lamp J is likewise provided at the central station's visual communicating apparatus, and is seen to be connected in series with said common indicator lamp conductor 42 and a wire 49, said wire, in turn, being connected to a stationary contact 50 of a multi-contact switch 51, later to be referred to.

As will be hereinafter explained in greater detail, indicator lamp J lights whenever a call having previously been placed by one of the system's stations, is answered, said lamp J thus indicating that the central station is "busy" answering said call.

Indicator lamp K is likewise included in the central station's visual communicating apparatus and is seen to be connected in series with wire 52 and wire 53, the latter being connected to one terminal $T_1$ of a suitable source of A.C. electrical energy.

Indicator lamp K is intended to light whenever the remote station having placed a call is connected to the audible communicating apparatus at the central station.

A plurality of normally-open switches N is provided at the central station one each of which is associated with one of the remote stations, the switch for remote station #1 being identified by the reference character N–1, for remote station #2 by reference character N–2, and similarly identified for the other remote stations, not herein shown. Each of said switches is seen to be connected to a common conductor 54, the latter connecting through wire 55 to the positive terminal of the aforesaid D.C. energy source. The opposite end of each switch is likewise seen to be connected to the third conductor C associated with each remote station, for example, switch N–1 connecting with conductor C–1. Each of said switches N–1, N–2, etc., is also preferably of the push-button, self-return type so that when depressed it connects the corresponding third conductor C to said positive D.C. terminal and when released disconnects the latter from said corresponding conductor. The purposes for said switches N–1, N–2, etc. will be hereinafter explained in detail.

The audible communicating apparatus at the central station preferably includes a telephone unit 56 which has its associated cradle 57 mounted on the movable contacts 60 and 61 of the aforesaid multi-contact switch 51.

Said telephone unit 56 is likewise seen to be connected to a conventional voice-operated D.C. amplifier 62, and by wire 63 to a stationary contact 64 of said switch 51. The negative terminal of amplifier 62 is connected by wire 67 to the movable contact 60 of said switch 51 and also in parallel with wire 43 and the aforesaid negative terminal of the D.C. energy source 45. The positive terminal of said amplifier is likewise seen to be connected by wire 68 to a stationary contact 70 of a relay 72. Another terminal of this amplifier, identified as the line terminal, is connected to stationary contact 73 of said relay 72.

The coil of relay 72 is seen to be connected between the aforesaid negative D.C. terminal and a wire 75, the latter connecting to the control means M presently to be described.

It may be desirable to provide for one or more additional telephone units whereby the hospital attendant may answer a calling remote station from one of a plurality of duty stations at a location other than at the central station, for example in a laboratory, operating room and the like.

For this purpose, a telephone unit 80 is located at each of a plurality of remote duty stations only one of which is herein shown, said unit being connected in parallel with the telephone unit 56 so as to be operable with and/or in place of the latter in answering a call.

A plurality of indicating lamps H–1, J–1 and K–1 are likewise provided at each remote duty station, each being connected in parallel with the corresponding indicator lamp H, J and K respectively at said central station to thereby simultaneously indicate the above mentioned operating conditions at said central and remote duty stations.

A multi-contact switch 51*a* is also provided at each of said duty stations, being identical to the aforesaid switch 51 at the central station and connected in parallel therewith so that either telephone unit 80 or 56, respectively, may cause the calling station to be connected to the remote duty stations or central station. The several contacts of switch 51*a* connected in parallel with the corresponding contacts of switch 51 are identified in each instance by the reference character having the suffix "*a*" added thereto.

A switch 82 at each remote duty station is connected between the positive D.C. terminal and through wire 83 to the control means M and is thus intended to be operated by the attendant at said remote duty station to connect said telephone unit 80 to the calling remote station.

As previously mentioned, the communication system of the present invention is provided with control means M now to be described in detail, which are operable to automatically seek out and connect a calling remote station to the central station and/or the remote duty stations.

In the present embodiment of communication system, the control means M is seen to include a multi-contact switch 90, each of the stationary contacts of which is separately connected to one of the third conductors C for the remote stations, for example third conductor $C_1$ of remote station #1 is connected to one of the stationary switch contacts as is identified by the reference character 90*a*. In like manner the conductor $C_2$ for remote station #2 is connected to the next adjacent switch contact 90*b*. Although not herein shown, the third conductor for each of the remaining remote stations is intended to be connected to one of the remaining stationary contacts of said switch, the latter being identified respectively in chronological order by the reference numerals 90*c*, 90*d*, etc.

The switch 90 is seen to have a movable contact 91 which is adapted to wipe across and separately connect with each of the stationary contacts 90*a*, 90*b*, etc. and hence the associated conductor $C_1$, $C_2$, etc. The movable contact 91 likewise connects with the aforementioned wire 83 connecting with the switch 82 at the remote duty station, said contact also connecting with one end of an isolating resistance element 93. Although herein shown as a resistor, said isolating resistance may also be in the form of an inductance, said element, as will be hereinafter apparent, being effective to isolate the output of the amplifier 62 from the D.C. energy source.

The opposite end of resistance element 93 is connected to a fixed contact 94 of relay 95, said contact 94 likewise being connected to one end of the coil 96 of said relay 95.

A second switch 98 has a single stationary contact 99 connected by wire 101 to the coil 102 of a relay 103. Switch 98 is also provided with a movable contact 104 which is connected by wire 105 to a fixed contact 106 of relay 107.

The switches 90 and 98 are preferably mounted on a single shaft so that the movable contacts 91 and 104, respectively, may be simultaneously actuated.

An electric motor 112 is preferably utilized to actuate the movable contacts 91 and 104 of said switches 90 and 98, the rotating member of said motor being connected to the shaft mounting said movable contacts. In the present circuitry, the motor 112 is seen to be connected by line 113 to the terminal $T_1$ of the aforesaid A.C. potential source, and by line 114 to a stationary contact 115 of relay 103.

The movable contact 116 of relay 103 is seen to be connected by wire 118 to a stationary contact 120 of relay 95, the movable contact 121 cooperating with said stationary contact 120, in turn, being connected by wire 123 to the remaining terminal $T_2$ of the A.C. potential source.

With this circuitry, the motor 112 is connected across the terminals $T_1$ and $T_2$ when the contacts 120 and 121 of relay 95 and contacts 115 and 116 of relay 103, respectively, are in their closed positions.

The relay 95 in the instant control means is also seen to have a fixed contact 125 adapted to be engaged by the aforesaid movable contact 121, and which, in turn, is connected by wire 126 to one side of each of the indicator lamps K and K–1 at the central station and each remote duty station, respectively. The opposite side of each of said indicator lamps is connected by wire 128 to the A.C. terminal $T_1$. In this manner when contacts 121 and 125 are in a closed position, the indicator lamps K and K–1 are illuminated to thus indicate, as is aforementioned, that a call placed by a remote station has been answered.

Relay 95 is also provided with a stationary contact 130 which is adapted to be engaged by a movable contact 131, said stationary contact being connected by wire 75 to one side of the coil 133 of relay 72. The opposite side of relay coil 133 is connected to the aforesaid negative terminal of the D.C. energy source through wire 43.

The movable contact 131 of relay 95 is also seen to be connected by wire 134 to the positive terminal of the D.C. energy source, and in parallel with the latter and the aforesaid common conductor 54 connecting with one side of each of the switch elements N–1, N–2, etc. Said wire 134 likewise connects in parallel with the remaining side of coil 102 of relay 103, the movable contact 61*a* of the multi-point switch 50*a* and the aforementioned switch 82 at each remote duty station.

An additional movable contact 135 of relay 95 is connected in parallel with movable contact 131 and is adapted to engage with the stationary contact 94 of said relay.

To complete the circuitry for relay 95, the remaining side of its coil 96 is connected by wire 137 to a stationary contact 139 of relay 107, said latter relay contact being engageable with a corresponding movable contact 140. Said movable contact 140, in turn, is connected to the aforementioned common line conductor B, and is likewise adapted to engage stationary contact 106 of said relay when the latter is in its de-energized condition.

Said line conductor B is seen to be directly connected in parallel with one side of coil 142 of relay 107, the opposite side of said coil being connected by wire 143 in parallel with stationary contacts 50 and 50*a* of switches 51 and 51*a* located respectively at the central and remote duty stations.

The common line conductor A connects with the aforesaid positive terminal of the D.C. energy source and to a movable contact 145 of the relay 48, said contact adapted to engage stationary contact 47 of said relay.

The coil 147 of relay 48 is connected in series with the D.C. energy source and said line conductor A.

To complete the circuitry for the instant embodiment of communication apparatus, the line terminal of the amplifier 62 as is aforementioned, is preferably seen to be connected to stationary contact 73 of the relay 72. When the system is not in use, the line terminal is preferably disconnected from the circuitry associated with the remote stations, and for this purpose the wire 83 connecting with the movable contact 91 of the multi-point switch 90 in the control means is, in turn, connected to movable contact 149 of relay 72, said movable contact adapted to engage with the aforesaid contact 73 to thus connect the line terminal of the amplifier to the movable contact 91 of said switch. When the system is not in use relay contacts 73 and 149 are in an open position thereby disconnecting the line terminal of said amplifier from the switch 90.

It is likewise preferable when the system is not in use to disconnect the amplifier 62 from the positive terminal of the D.C. energy source, and for this purpose a movable contact 150 of relay 72 is connected to said positive terminal. Movable contact 150 and the aforesaid stationary contact 70 of said relay are in an open position when the system is not in use being thus effective to disconnect said amplifier from the positive terminal of the D.C. energy source.

Having thus described the preferred embodiment of circuitry for the instant intercommunication system, the manner in which the same is automatically operable to provide two-way visual and audible communication between a calling and a called station of said system will now be described in detail.

When not in use, that is, when no calls are placed and/or are being completed between stations, the several components of said system are in the position shown in the schematic wiring diagram; relays 48, 72, 95 and 107 are in a de-energized position whereas, relay 103 is in an energized position thus disconnecting the electric motor 112 from the A.C. energy source.

At each remote station, the manually-operated switch 12, 12', etc., is in an open position whereas switch 8, 8' etc. thereat is in a normally-closed position.

Assuming now for example that the patient at remote station #1 desires assistance, he closes switch 12 momentarily which energizes the coil or relay R at his station, said coil being connected across the D.C. energy source through the closed switch 12, common line conductor A, third conductor $C_1$, and indicator lamp L–1 to the negative side of the D.C. energy source.

Relay R hence energizes to close its contacts 4 and 14, 5 and 19 and open contacts 6 and 23.

Upon contacts 4 and 14 being closed, the coil of relay R is "locked in" to retain said relay in its energized condition.

Contacts 5 and 19 when closed, connect the indicator lamps 20 and 21 across the line conductors A and B and thereby light to indicate to the patient and in the corridor adjacent his room that the call has been placed.

Contacts 6 and 23, when opened, disconnect the speaker-microphone unit 28 from the D.C. energy source to thus de-energize the speaker thereof during the interval of transmission of audible intelligence from the central and/or remote duty stations answering the call.

With switch 12 momentarily closed, relay 48 is also energized so as to close its contacts 47 and 145 to thus connect the "call placed" lamp H and H–1 at the central and each remote station respectively to the D.C. energy source whereby the same are illuminated to indicate at said stations that a call has been placed.

The attendant, for example at the central station, upon seeing indicator lamps L–1 and H illuminated realizes that a patient is calling for assistance at remote station #1. He then lifts the telephone unit 56 from its cradle 57 which closes contacts 50 and 61 and contacts 64 and 60 of switch 51.

Upon contacts 50 and 61 being closed, the positive terminal of the D.C. energy source is connected to wire 143 and the coil 142 of relay 107 whereby the latter is energized to close its contacts 139 and 140 and open contacts 140 and 106. Indicator lamp J is likewise illuminated to thus indicate that the system is busy answering a call.

Closing said contacts 139 and 140 is effective to transfer the negative terminal of the D.C. energy source from one side of the coil 102 of relay 103, previously connected through common conductor B, contacts 106 and 140, switch contacts 90 and 104 of switch 98 and line 101, through said closed contacts 139 and 140 and line 137, to one side of the coil 96 of relay 95.

Opening contacts 106 and 140 of relay 107 disconnects the coil 102 of relay 103 from the D.C. energy source, said connection being made through the contacts 99 and 104 of switch 98 in its "home position," i.e. the position the movable contact 104 thereof returns when all calls have been answered and the system is returned to its inactive condition.

The de-energization of coil 102 causes its contacts 115 and 116 to close which connects the electric motor 112 through wires 113 and 114, closed contacts 115 and 116, wire 118 and closed contacts 120, 121 of relay 95, across the A.C. energy source.

Motor 112 is thereby energized and rotates the movable contact 91 of switch 90 which is effective to successively carry said contact into engagement with each of the stationary contacts 90*a*, 90*b*, 90*c*, etc. of said switch.

When the patient at the remote station #1 previously closed the switch 12, the third conductor $C_1$ of said station was also connected to the positive terminal of the D.C. energy source whereby a positive potential was then applied to the corresponding stationary contact 90*a* of switch 90 assigned to said remote station.

With this condition thus existing, the movable contact 91 seeks out and when brought into engagement with said activated contact 90*a*, said positive potential is instantaneously applied to the opposite side of the coil 96 of relay 95 whereby the same is energized.

As a result, contacts 94 and 135, 130 and 131, and 121 and 125 of relay 95 are closed, and contacts 120 and 121 of said relay are opened.

Upon contacts 120 and 121 being opened the electric motor 112 is disconnected from its A.C. energy source so that the movable contact 91 of switch 90 remains in contact with the stationary contact 90*a* thus connecting the remote station #1 through its third conductor $C_1$ to said movable contact 91.

Closing contacts 94 and 135 of relay 95 is effective to connect its coil 96 directly across the terminals of the D.C. energy source thus locking the same in its energized condition.

Closing contacts 121 and 125 of relay 95 is effective to connect the indicator lamps K and K–1 at the central station and each remote duty station respectively, to said D.C. energy source whereby the same are illuminated to thus indicate that the call placed by the remote station, in this instance remote station #1, has been answered and its third conductor $C_1$ is connected to the movable contact 91 of switch 90.

Closing contacts 130 and 131 of relay 95 is effective to connect the coil 133 of relay 72 to the positive terminal of the D.C. energy source whereby relay 72 is energized.

As relay 72 is thus energized its contacts 70 and 150, 73 and 149 are closed.

Closing the contacts 70 and 150 of said relay 72 is effective to connect the positive terminal of the D.C. amplifier 62 to the positive side of the aforesaid D.C. energy source so that said amplifier is "turned on."

Closing the contacts 73 and 149 is effective to connect the line terminal (audio output terminal) of said amplifier through connecting wire 83 to the movable contact 91 of switch 90 and hence the third conductor $C_1$ of remote station #1, this connection being, in turn, thus effective to permit the attendant at the central station to talk directly to the patient at said remote station #1 through the telephone unit 56 and connected speaker-microphone unit 28.

As the attendant lifts the telephone unit 56 off its cradle it will be recalled that contacts 60 and 64 of switch 51 are also closed. In this manner the telephone unit 56 is connected through wire 63, contacts 60 and 64, wires 67 and 43 to the negative terminal of the D.C. energy source thereby enabling said unit to transmit amplified human intelligence to the connected remote station. As previously indicated, the isolating resistance element 93 interposed between the D.C. energy source and wire 83 isolates the audio output of said amplifier unit 62 from said D.C. source.

Normally, when the attendant lifts the telephone unit at his duty station, for example at the central station to initiate the answering of a call placed by a patient at a remote station, he may desire to immediately re-set the relay R, R', etc., at the respective remote station so as to condition the apparatus to be able to place a subsequent call.

For this purpose, the aforementioned normally-closed switch N–1, N–2, etc. assigned to one of the remote stations for example switch N–1 assigned to remote station #1 is seen to be connected on one side to the conductor $C_1$ in parallel with the indicator lamp L–1. The opposite side of said switch N–1 connects to the aforementioned conductor 54 which, as will be recalled, connects directly with the positive terminal of the D.C. energy source.

When the attendant closes said switch N–1 a positive potential is thus connected directly to the junction of conductor $C_1$ and indicator lamp L–1 and is effective to remove the negative from said junction thereby causing the relay to become de-energized and to open its contacts 4 and 14, 15 and 19, and close contacts 6 and 23.

Opening contacts 4 and 14 removes the locking circuit for said coil, and upon returning the switch N–1 to its open position, said relay and the circuitry associated with its respective contacts are returned to their de-energized condition to thus await a subsequent call originating therefrom.

With the closing of contacts 6 and 23, the speaker-microphone unit 28 is thus actuated so that the patient can converse directly with the attendant at the duty station.

In addition to being resettable at the central station, the relay R at the calling remote station may likewise to re-set from any one of the remote duty stations.

To accomplish this, it will be recalled that a normally-open switch 82 is provided at each duty station being in addition connected on one side by wire 134 directly to the positive terminal of the D.C. energy source, and on the opposite side to wire 83, the latter connecting to the movable contact 91 of switch 90.

With this circuitry, it will be realized that when switch 82 is closed, a positive potential is applied directly to the respective contact 90*a*, 90*b*, etc., of said switch 90 which is thus effective through the respective conductor $C_1$, $C_2$, etc., connected therewith to remove the negative from the coil of relay R and cause its being conditioned to its de-energized position.

It is likewise desirable to re-set the relay R at the remote station which placed the call to the central station or duty stations. Hence, if an attendant is in the corridor for example, and notices the corridor lamp 21 illuminated he can immediately enter the room and by opening switch 8 de-energize the coil of relay R and also extinguish lamps H and corresponding lamp L, for example L–1 for remote station #1, thereby indicating to the attendant at the central station or remote duty stations that the call has been answered.

When the attendant at the answering station has concluded his conversation with the patient at the calling remote station, he replaces the telephone unit 56 or 80 depending on his location onto its respective cradle whereby the switch 51, 51*a* is actuated to open the now closed contacts thereof, namely contacts 50, 61, and 60, 64 of switch 51, or corresponding contacts 50*a*, 61*a* and 60*a*, 64*a* of switch 51*a* at the remote duty station.

When this occurs and assuming that no additional calls have since been placed from other remote stations, relays 107, 95 and 103 are de-energized which thereby connects the motor 112 once again to the terminals $T_1$ and $T_2$ of the A.C. energy source. Said motor is thereafter operable to rotate the movable contact 91 of switch 90 away from its position engaging stationary contact 90*a* and the movable contact 104 of switch 98 toward its stationary contact 99.

Said motor continues to rotate said movable contacts until movable contact 104 engages its corresponding stationary contact 99 at which time relay 103 is again energized so as to disconnect the motor 112 from its energy source.

At this instant movable contact 91 of switch 90 is in engagement with an isolated stationary contact that is not connected in circuit, said contact being identified in the schematic wiring diagram, by the reference character 90*i*.

These respective positions taken by the movable contacts 91 and 104 of switches 90 and 98 are the positions occupied by the same whenever the communication system is not in use, said positions being referred to as the "homing positions" for said switches in the instant control means M.

Assuming now that several or more calls are placed by the remote stations, whereby a positive potential is applied through the corresponding third conductor $C_1$, $C_2$, $C_3$, etc. of each calling station to the associated stationary contact 90*a*, 90*b*, 90*c*, etc. of the switch 90, it will now be realized that at the conclusion of one call, for example the call to remote station #1, and the attendant then replaces the telephone unit onto its cradle to thus actuate the respective switch 51 or 51*a*, the electric motor 112 is energized to cause the movable contact 91 of switch 90 to be carried into successive engagement with the stationary contacts of said switch to thus seek out the next adjacent contact having the aforesaid positive potential applied thereto.

And upon connecting with said adjacent stationary contact, the control means M is thus operable to connect the calling remote station to the answering central or remote duty station in the identical manner as is above described whereby the next call can be automatically answered.

With the instant circuitry, it may also be desirable to initiate a call from the central station to one of the remote stations.

To accomplish this, the attendant at the central station lifts the telephone unit 56 off its cradle 57 to thus actuate switch 51 and also closes the switch, for example switch N–1 for remote station #1 whereby the relay R at said station is energized, the circuits associated with said actuated switch elements thus being operable to automatically connect the remote station #1 to the central station in the identical circuit as previously described.

With this circuitry and operation as just described, it will also be realized that the attendant may monitor or listen in to the remote stations in the event that a patient is calling for assistance and cannot initiate the call himself. In this instance, the indicator lamp 31 at the connected remote station is illuminated to thus notify the patient that his room is being monitored.

Still another important operative feature of the instant communication system will be apparent when, for example, a number of remote stations, such as remote stations 1, 2 and 3 are each calling and the attendant desires to communicate with station #3 before stations 1 and 2 which would normally be connected to his apparatus before station 3.

To accomplish this, the attendant lifts the telephone unit 56 from its cradle 57 to actuate switch 51 whereby the motor 112 drives the movable contact 91 of switch 90 which, as will be recalled, is effective to seek out and find the potential impressed on the conductor $C_1$ associated with remote station #1. When said potential is found on the stationary contact 90*a* of switch 90 it will likewise be recalled that the motor is disconnected from its A.C. energy source and the indicator lamp J is illuminated to thus indicate that remote station #1 is connected to the central station. At this instant, the attendant, instead of beginning his communication with the remote station #1 depresses the cradle 57 opening switch 51 which is effective to connect the motor 112 once again to its energy source whereby the movable contact 91 is driven to seek out the next activated stationary contact 90*b* associated with remote station #2. Indicator lamp J is again illuminated when remote station #2 is connected to the central station.

The attendant once more depresses cradle 57 to open the switch 51 whereby the motor 112 and movable contact 91 of switch 90 are actuated so as to seek out and find the potential impressed on stationary contact 90*c* of said switch 90.

When this potential is thus formed, the remote station #3 is connected to the central station whereby the attendant may communicate directly with the patient in the usual manner. Since the relay R and associated circuitry at each of the remote stations 1 and 2 have not been re-set during this interval their previous calls are still unanswered. And, when the attendant finishes his communication with remote station #3 he may replace the telephone unit 56 on its cradle 57 and thereafter proceed in the usual manner as is above described, to successively answer said calls from stations 1 and 2.

In the event several or more beds are located in a single room, for example in a semi-private or ward room, it may be desirable to use separate communication apparatus such as is represented at each remote station #1 and #2 at each bed location in said room.

In this instance, and with reference directed particularly to FIG. 2, only one indicator lamp 21 need be used in the corridor for the entire room to thus indicate that someone in that room is calling for assistance. This indicator lamp is preferably connected at one side to the common conductor B and hence to the negative terminal of the D.C. energy source in the usual manner.

A diode element, as is indicated by dotted lines in the schematic wiring diagram at 22 is inserted into the circuit for the communication apparatus at each bed location, and is connected in series in the line that normally connects the relay contact 19 to one side of each of the indicator lamps 20 and 21. The diode is connected in said line between the lamps 20 and 21 and in such manner as to permit current to flow only in an upward direction through said wire as shown in said diagram. A jumper wire, likewise shown in said schematic diagram in dotted lines and identified by the reference character S, is connected to the opposite end of the one indicator lamp 21 being used for said room and also to the upper end of each diode element 22, said indicator lamp being thus isolated.

With this circuitry, when a patient at a predetermined bed location actuates switch 12 associated with his communication apparatus, the relay R is energized so as to close contacts 5 and 19 so that the indicator lamp 20 at his location is connected to the positive terminal of the D.C. energy source and is hence illuminated. Current likewise flows through the diode associated with said bed location, and thence through the jumper S to the corridor lamp 21 whereby said lamp is also illuminated.

With the diodes connected in the manner described, current cannot flow to any other indicator lamp 20 located at the other bed locations in the room and are thus effective to prevent a false indication that a call has been placed from said locations.

Having thus described in detail a preferred embodiment of the audible-visual communication system of the present invention it is to be realized that the inventive concepts of the same as are disclosed herein are susceptible to various modifications, combinations and arrangements of the components thereof without departing from the scope of the invention as is defined in the appended claims.

What is claimed is:

1. An audible-visual intercommunication system for communication between a central station and each of a plurality of remote stations comprising audible and visual communication means at the central station and at each of the remote stations, a source of electrical energy for energizing said communication means, conductors interconnecting the communication means at the remote stations and said central station and said energy source and including a pair of conductors connected to said energy source and to all of said communication means, a multi-contact switch, a plurality of stationary contacts on said switch, a third conductor individual to the communication means at each remote station and separately connected from the latter to one of said stationary contacts, a movable contact on said switch, connecting means including means for connecting the communication means at said central station to said movable contact and to said energy source, means for carrying said movable contact into sequential engagement with said stationary contacts to selectively connect said movable contact with each remote station through its corresponding third conductor, said connecting means being automatically responsive to the attendant at said central station answering a call from one of said remote stations to cause said movable contact to seek out and connect with the third conductor corresponding to said calling remote station to thus provide intercommunication between the latter and said central station.

2. An audible-visual intercommunication system for communication between a central station and each of a plurality of remote stations comprising audible and visual communication means at the central station and at each of the remote stations, a source of electrical energy for energizing said communication means, conductors interconnecting the communication means at the remote stations and said central station and said energy source and including a pair of conductors connected to said energy source and to all of said communication means, switching means connecting with the communication means at said central station and to said energy source, a third conductor individual to the communication means at each remote station and separately connected from the latter to said switching means, and said switching means being normally in a non-operated condition and automatically actuated to an operating condition in response to the attendant at said central station answering a call from one of said remote stations to cause said switching means to seek out and connect with the third conductor corresponding to said calling remote station to thus provide intercommunication between the latter and said central station.

3. An audible-visual intercommunication system for communication between a central station and each of a plurality of remote stations comprising audible and visual communication means at the central station and at each of the remote stations, a source of electrical energy for energizing said communication means, conductors interconnecting the communication means at the remote stations and said central station and said energy source and including a pair of conductors connected to said energy source and to all of said communication means, a multi-contact switch, a plurality of stationary contacts on said switch, a third conductor individual to the communication means at each remote station and separately connected from the latter to one of said stationary contacts, a movable contact on said switch connecting with the communication means at said central station and to said energy source, motor means coupled to said movable contact, and means in circuit with said motor means responsive to the attendant at said central station answering a call from one of said remote stations to cause the energization of said motor means effective to carry the movable contact into sequential engagement with the stationary contacts and seek out and connect the communication means at said one remote station through its corresponding third conductor to the communication means at said central station to provide for communication therebetween.

4. An audible-visual intercommunication system for communication between a central station and each of a plurality of remote stations comprising audible and visual communication means at the central station and at each of the remote stations, a source of electrical energy for energizing said communication means, conductors interconnecting the communication means at the remote stations and said central station and said energy source and including a pair of conductors connected to said energy source and to all of said communication means, switching means connecting with the communication means at said central station, a third conductor individual to the communication means at each remote station and separately connected from the latter to said switching means, means actuatable by a patient at each of said remote stations and causing a potential from said energy source to be impressed upon the corresponding third conductor of said station, said switching means being responsive to the attendant at said central station in answering a call from a calling remote station to seek said potential on said third conductor corresponding to said calling remote station to thereby connect the communication means at said remote station through said third conductor to the communication means at said central station.

5. An audible-visual intercommunication system for communication between a central station and each of a plurality of remote stations comprising audible and visual communication means at the central station and at each of the remote stations, a source of electrical energy for energizing said communication means, conductors interconnecting the communication means at the remote stations and said central station and said energy source and including a pair of conductors connected to said energy source and to all of said communication means, switching means connecting with the communication means at said central station, a third conductor individual to the communication means at each remote station and separately connected from the latter to said switching means, means actuatable by a patient at each of said remote stations and causing a potential from said energy source to be impressed upon the corresponding third conductor of said station, said switching means being responsive to the attendant at said central station in answering a call from a calling remote station to seek said potential on said third conductor corresponding to said calling remote station to thereby connect the communication means at said remote station through said third conductor to the communication means at said central station, and means in circuit with said switching means and responsive to said potential to retain said switching means connecting with said calling remote station through said corresponding third conductor.

6. An audible-visual intercommunication system for communication between a central station and each of a plurality of remote stations comprising audible and visual communication means at the central station and at each of the remote stations, a source of electrical energy for energizing said communication means, conductors interconnecting the communication means at the remote stations and said central station and said energy source and including a pair of conductors connected to said energy source and to all of said communication means, switching means connecting with the communication means at said central station, a third conductor individual to the communication means at each remote station and separately connected from the latter to said switching means, means actuatable by a patient at each of said remote stations and causing a potential from said energy source to be impressed upon the corresponding third conductor of said station, said switching means being responsive to the attendant at said central station in answering a call from a calling remote station to seek said potential on said third conductor corresponding to said calling remote station to thereby connect the communication means at said remote station through said third conductor to the communication means at said central station, means in circuit with said switching means responsive to said potential to retain said switching means in connection with said calling remote station through said corresponding third conductor, and means responsive to the attendant at said central station terminating communication with said calling remote station to actuate said switching means and cause it to seek out the potential on still another third conductor connecting with a second calling remote station.

7. An audible-visual intercommunication system for communication between a central station and each of a plurality of remote stations comprising audible and visual communication means at the central station and at each of the remote stations, a source of electrical energy for energizing said communication means, conductors interconnecting the communication means at the remote stations and said central station and said energy source and including a pair of conductors connected to said energy source and to all of said communication means, a multi-contact switch, a plurality of stationary contacts on said switch, a third conductor individual to the communication means at each remote station and separately connected from the latter to one of said stationary contacts, a movable contact on said switch connecting with the communication means at said central station, means actuatable by a patient at each of said remote stations causing a potential from said energy source to be impressed upon the corresponding third conductor of the calling station and connected stationary contact of said switch, and means for carrying said movable contact into sequential engagement with said stationary contacts to seek said potential on the third conductor of said calling remote station to thereby connect the communication means at said calling remote station through said third conductor to the communication means at said central station.

8. An audible-visual intercommunication system for communication between a central station and each of a plurality of remote stations comprising audible and visual communication means at the central station and at each of the remote stations, a source of electrical energy for energizing said communication means, conductors interconnecting the communication means at the remote stations and said central station and said energy source and including a pair of conductors connected to said energy source and to all of said communication means, a multi-contact switch, a plurality of stationary contacts on said switch, a third conductor individual to the communication means at each remote station and separately connected from the latter to one of said stationary contacts, a movable contact on said switch connecting with the communication means at said central station, means actuatable by a patient at each of said remote stations causing a potential from said energy source to be impressed upon the corresponding third conductor of the calling station and connected stationary contact of said switch, means for carrying said movable contact into sequential engagement with said stationary contacts to seek said potential on the third conductor of said calling remote station to thereby connect the communication means at said calling remote station through said third conductor to the communication means at said central station, and means in circuit with said movable contact and responsive to said potential to retain said movable contact connecting with said calling remote station through said corresponding third conductor.

9. An audible-visual intercommunication system for communication between a central station and each of a plurality of remote stations comprising audible and visual communication means at the central station and at each of the remote stations, a source of electrical energy for energizing said communication means, conductors interconnecting the communication means at the remote stations and said central station and said energy source and including a pair of conductors connected to said energy source and to all of said communication means, a multi-contact switch, a plurality of stationary contacts on said switch, a third conductor individual to the communication means at each remote station and separately connected from the latter to one of said stationary contacts, a movable contact on said switch connecting with the communication means at said central station, means actuatable by a patient at each of said remote stations causing a potential from said energy source to be impressed upon the corresponding third conductor of the calling station and connected stationary contact of said switch, means for carrying said movable contact into sequential engagement with said stationary contacts to seek said potential on the third conductor of said calling remote station to thereby connect the communication means at said calling remote station through said third conductor to the communication means at said central station, means in circuit with said movable contact and responsive to said potential to retain said movable contact connecting with said calling remote station through said corresponding third conductor, and means responsive to the attendant at said central station terminating communication with said calling remote station to actuate said carrying means to thus re-actuate said movable contact and carry the same into sequential engagement with said stationary contacts so as to seek the potential on still another third conductor connecting with a second stationary contact and corresponding to a second calling remote station.

10. An audible-visual intercommunication system for communication between a central station and each of a plurality of remote stations comprising audible and visual communication means at the central station and at each of the remote stations, a source of electrical energy for energizing said communication means, conductors interconnecting the communication means at the remote stations and said central station and said energy source and including a pair of conductors connected to said energy source and to all of said communication means, switching means connecting with the communication means at said central station, a third conductor individual to the communication means at each remote station and separately connected from the latter to said switching means, and said switching means being operable to selectively connect the visual communication means at each of said to the communication means at said central station to remote stations through its corresponding third conductor thus provide for intercommunication therebetween.

11. An audible-visual intercommunication system for communication between a central station and each of a plurality of remote stations comprising audible and visual communication means at the central station and at each of the remote stations, a source of electrical energy for energizing said communication means, conductors interconnecting the communication means at the remote stations and said central station and said energy source and including a pair of conductors connected to said energy source and to all of said communication means, switching means connecting with the communication means at said central station, a third conductor individual to the communication means at each remote station and separately connected from the latter to said switching means, and said switching means being operable to selectively connect the audible communication means at each of said remote stations through its corresponding third conductor to the communication means at said central station to thus provide for the intercommunication therebetween.

References Cited in the file of this patent

UNITED STATES PATENTS

| | | |
|---|---|---|
| 1,665,466 | Middleton | Apr. 10, 1928 |
| 2,248,899 | Saaty | July 8, 1941 |
| 2,740,842 | Schneider et al. | Apr. 3, 1956 |
| 2,755,339 | Logan | July 17, 1956 |